United States Patent
Yoo

(10) Patent No.: US 7,933,299 B2
(45) Date of Patent: Apr. 26, 2011

(54) DEVICE AND METHOD FOR CONTROLLING SWITCHOVER OF BROADCASTING CHANNEL IN DIGITAL MULTIMEDIA BROADCASTING RECEIVER

(75) Inventor: Hoon Yoo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 693 days.

(21) Appl. No.: 11/377,022

(22) Filed: Mar. 16, 2006

(65) Prior Publication Data

US 2006/0209907 A1    Sep. 21, 2006

(30) Foreign Application Priority Data

Mar. 16, 2005  (KR) .................. 10-2005-0021799

(51) Int. Cl.
  *H04J 3/22* (2006.01)
(52) U.S. Cl. ...................................................... 370/542
(58) Field of Classification Search .................. 370/536, 370/498, 542; 375/240.26; 725/116; 386/81
See application file for complete search history.

(56) References Cited

U.S. PATENT DOCUMENTS

| | | | |
|---|---|---|---|
| 5,933,192 A | 8/1999 | Crosby et al. | |
| 5,959,659 A | 9/1999 | Dokic | |
| 6,334,217 B1 | 12/2001 | Kim | |
| 6,847,781 B1 * | 1/2005 | Sugimura et al. | 386/81 |
| 6,940,876 B1 * | 9/2005 | Crinon | 370/535 |
| 2004/0194134 A1 | 9/2004 | Gunatilake et al. | |
| 2005/0083932 A1 * | 4/2005 | Lee et al. | 370/390 |

FOREIGN PATENT DOCUMENTS

| | | |
|---|---|---|
| EP | 1 098 534 | 5/2001 |
| JP | 10-190617 | 7/1998 |
| JP | 2003-110954 | 4/2003 |
| JP | 2004-112504 | 4/2004 |
| KR | 100309099 | 9/2001 |
| KR | 1020040063381 | 7/2004 |
| WO | WO 03/088646 | 10/2003 |

* cited by examiner

*Primary Examiner* — Derrick W Ferris
*Assistant Examiner* — Omar Ghowrwal
(74) *Attorney, Agent, or Firm* — The Farrell Law Firm, P.C.

(57) ABSTRACT

Provided is a device and method for controlling switchover of a broadcasting channel in a digital multimedia broadcasting receiver. The device includes a first demultiplexing unit for firstly buffering transport stream packets, searching the buffered transport stream packets for a PAT (program association table), a PMT (program map table), and an intra frame, and obtaining program information on the broadcasting channel to be switched over; and a second demultiplexing unit for secondly buffering the transport stream packets and, on the basis of the obtained program information, searching the secondly buffered transport stream packets for an audio or video transport stream packet of the corresponding broadcasting channel, and performing audio or video demultiplexing for the searched audio or video transport stream packet.

11 Claims, 5 Drawing Sheets

DEVICE AND METHOD FOR CONTROLLING SWITCHOVER OF BROADCASTING CHANNEL IN DIGITAL MULTIMEDIA BROADCASTING RECEIVER

PRIORITY

This application claims priority under 35 U.S.C. §119 to an application entitled "Device and Method for Controlling Switchover of Broadcasting Channel in Digital Multimedia Broadcasting Receiver" filed in the Korean Intellectual Property Office on Mar. 16, 2005 and assigned Serial No. 2005-21799, the contents of which are incorporated herein by reference.

BACKGROUND OF THE INVENTION

1. Field of the Invention

The present invention relates generally to a digital broadcasting system, and in particular, to a device and method for controlling channel switchover in a digital multimedia broadcasting (DMB).

2. Description of the Related Art

A motion picture experts group (MPEG)-2 transport stream (TS) is used as a transport standard of satellite or terrestrial DMB. A digital broadcasting center transmits program specific information (PSI) to a digital broadcasting receiver, and the digital broadcasting receiver switches-over a broadcasting channel with reference to the received PSI.

The PSI is carried in a number of tables including a program association table (PAT) and a program map table (PMT). The PAT includes an identification (ID) of a broadcasting channel on the air, and a packet ID (PID) having additional information of the broadcasting channel. The PMT includes a PID of The audio or video TS of the corresponding broadcasting channel should be extracted for viewing a specific broadcasting. First confirm the PMT before obtaining the PID of the audio or video TS, and similarly the PAT is confirmed before obtaining the PID of the PMT. As such, a search is done of the PAT and the PMT to confirm the audio/video for purposes for viewing a broadcasting.

The PAT is set to have a transport period of about 0.5 seconds, and the PMT is set to have a transport period of approximately from 0.5 seconds to 1 second. The transport period depends on the digital broadcasting center. Transport is relatively frequently performed to minimize a channel switchover time. The PAT and the PMT should always be searched to switch the channel. Therefore, searching for the PAT and the PMT can take one or more seconds maximally. As a result, in a conventional art, the channel switchover time includes both an audio/video buffering time as well as a time taken to search for PSI data. Consequently, the channel switchover time is lengthened by the time taken to search for the PSI data.

FIG. 1 is a block diagram illustrating conventional demultiplexing in the digital broadcasting receiver.

If the digital broadcasting receiver receives TS packets, the TS buffer 22 buffers the received TS packets, following which; a PAT searcher 24 searches the buffered TS packets for a PAT. A header TS packet is analyzed to check whether the PID is '0' to determine whether there is a packet having PAT information among the continuously received TS packets. A PID of '0' represents that a payload has the PAT information.

From a successful search for the PAT, a PID list of a broadcasting channel and a PMT is obtained from the searched PAT, and a PID of the PMT of the and a PMT is obtained from the searched PAT, and a PID of the PMT of the broadcasting channel that a viewer desires to view is obtained. On the basis of the obtained PID of the PMT of the broadcasting channel that the viewer desires to view, a PMT searcher 26 analyzes the header of the TS packets buffered in the TS buffer 22 and confirms whether or not the TS packet is a corresponding PMT, thereby searching for the corresponding PMT.

Following a successful search for the PMT, a PID of an audio/video packetized elementary stream (PES) of the corresponding broadcasting channel is obtained from the searched PMT. Referring to the obtained PID of the video PES, a video TS packet of the corresponding broadcasting channel can be distinguished from the received TS packets. An intra frame searcher 28 can search the video TS packet of the corresponding broadcasting channel for an intra frame. If even the intra frame is searched, video/audio demultiplexing has only to be performed without a need to search for the PAT, the PMT, and the intra frame (this is because program information of the corresponding broadcasting channel has been searched). Simply, a video demultiplexer 30 confirms whether or not the TS packet is the video TS packet through the header analysis of the TS packets. If it is confirmed that the TS packet is the video TS packet, the video demultiplexer 30 performs the video demultiplexing and transmits the video data to a ring buffer (vid) 100. Even an audio demultiplexer 32 confirms whether or not the TS packet is an audio TS packet through the header analysis of the buffered TS packets. Upon confirmation that the TS packet is the audio TS packet, the audio demultiplexer 32 performs the audio demultiplexing and transmits the audio data to a ring buffer (aud) 150.

It is the intra frame searcher 28 that informs of the start of the audio/video demultiplexing. The intra frame searcher 28 searches for one perfect intra frame, and performs the demultiplexing including the intra frame. Therefore, the video demultiplexing can be performed only when the intra frame is searched, unlike the audio demultiplexing. There is an advantage in that the audio and video can be more easily synchronized with each other, if it is constructed to perform the audio demultiplexing after succeeding in searching for the intra frame as shown in FIG. 1.

The video or audio data is provided to each decoder (not shown), and each decoder decompresses a video or audio signal and outputs the decompressed video or audio signal through a display unit or a speaker for the viewer.

However, upon failure to search for the PAT, the buffered TS packets are discarded and the TS buffering and its subsequent steps are repeated. Upon success in searching the PAT but failure to search the PMT, the buffered TS packets are discarded and the TS buffering and its subsequent steps are repeated. Additionally upon success in searching for the PAT and the PMT but failure to search for the intra frame, the buffered TS packets are discarded and the TS buffering and its subsequent steps are again performed.

FIG. 2 illustrates an example for describing a video start time point based on the conventional demultiplexing.

On the assumption that the PATs are at 0.4 second, 0.9 seconds, and 1.4 seconds, the PMTs are at 0.3 seconds, 0.8 seconds, and 1.3 seconds, and the intra frames are at 0.1 second and 1.1 seconds, when the demultiplexing of FIG. 1 is performed, the PAT is searched at 0.4 seconds ($1^{st}$), the PMT is searched at 0.8 seconds ($2^{nd}$), and the intra frame is searched at 1.1 seconds ($3^{rd}$).

As a result, at 1.1 seconds after the channel switchover, a first video TS packet is demultiplexed. However, even though the first video TS packet is demultiplexed, a picture is not directly displayed on a screen of the display unit. Until the video ring buffer (vid) 100 of a rear stage buffers the TS packet for about 1 to 2 seconds, the picture is not displayed. The picture starts displaying after about 3.1 seconds on the assumption that a buffering time is 2 seconds.

SUMMARY OF THE INVENTION

It is, therefore, an object of the present invention to provide a device and method for eliminating unnecessary time taken to search for a PAT and a PMT, thereby minimizing a channel switchover time in a digital multimedia broadcasting receiver.

To achieve the above and other objects, there is provided a device for controlling switchover of a broadcasting channel in a digital multimedia broadcasting receiver, the device including a first demultiplexing unit for firstly buffering transport stream packets, searching the buffered transport stream packets for a PAT (program association table), a PMT (program map table), and an intra frame, and obtaining program information on the broadcasting channel to be switched over; and a second demultiplexing unit for secondly buffering the transport stream packets and, from the obtained program information, searching the secondly buffered transport stream packets for an audio or video transport stream packet of the corresponding broadcasting channel, and performing audio or video demultiplexing for the searched audio or video transport stream packet.

In another aspect of the present invention, there is provided a method for controlling switchover of a broadcasting channel in a digital multimedia broadcasting receiver, the method including firstly buffering transport stream packets; searching the firstly buffered transport stream packets for a PAT, a PMT, and an intra frame, and obtaining program information of the corresponding broadcasting channel; from the obtained program information, searching the firstly buffered transport stream packets for an audio or video transport stream packet of the corresponding broadcasting channel, and demultiplexing the searched audio or video transport stream packet; from the program information, secondly buffering the transport stream packets; and from the obtained program information, searching the secondly buffered transport stream packets for an audio or video transport stream packet of the corresponding broadcasting channel, and audio or video demultiplexing the searched audio or video transport stream packet.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
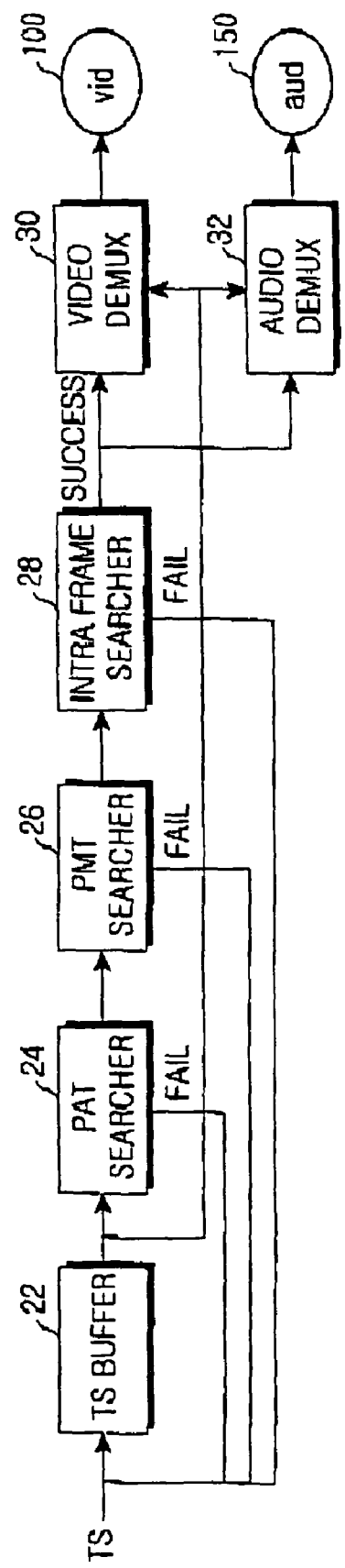
FIG. 1 is a block diagram illustrating conventional demultiplexing in a digital broadcasting receiver.
Figure 2:
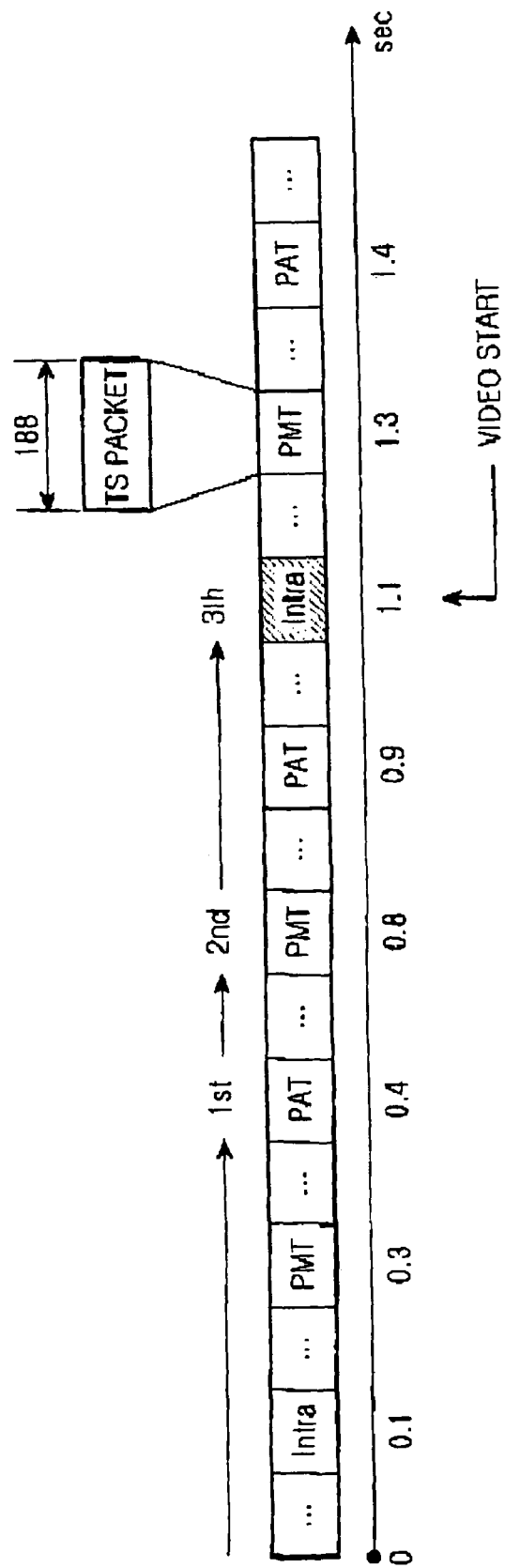
FIG. 2 illustrates an example for describing a video start time point based on conventional demultiplexing.

A preferred embodiment of the present invention will now be described in detail with reference to the annexed drawings.

In the drawings, the same or similar elements are denoted by the same reference numerals even though they are depicted in different drawings. In the following description, a detailed description of known functions and configurations incorporated herein has been omitted for conciseness.

Figure 3:
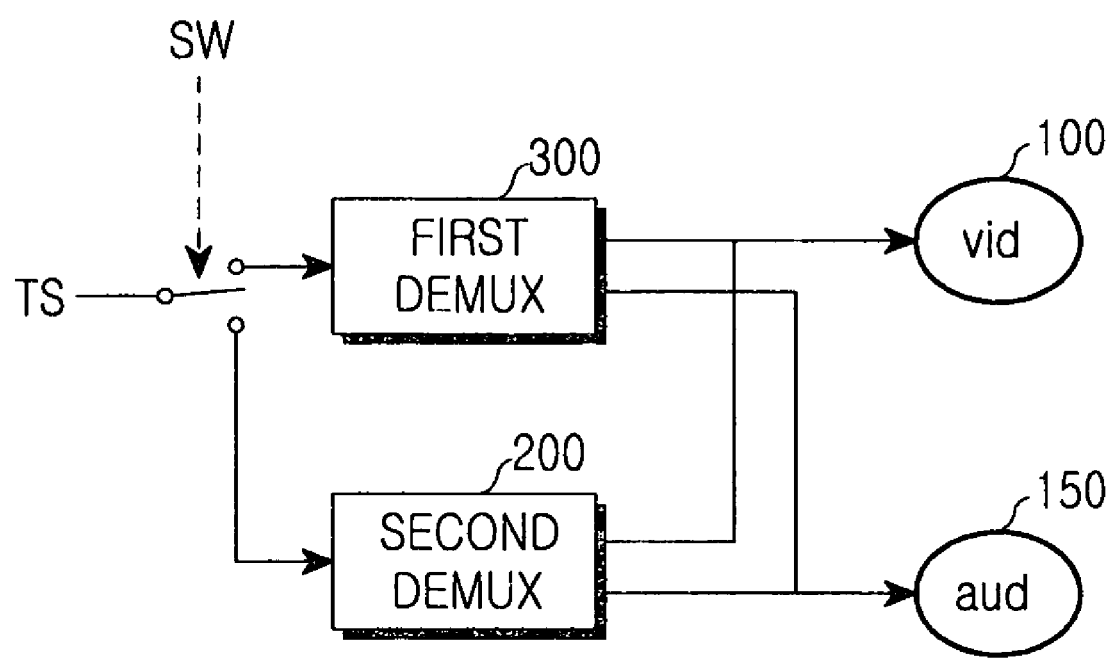
FIG. 3 illustrates a construction of a demultiplexing device of a digital broadcasting receiver according to the present invention.

FIG. 3 illustrates a construction of a demultiplexing device of a digital broadcasting receiver according to the present invention.

The present invention provides fort demultiplexing that is separately performed as a first demultiplexing and second demultiplexing. A second demultiplexing unit 200 has the same basic construction as in FIG. 1. Its detailed description has therefore been omitted. However, the second demultiplexing unit 200 is enabled to search for a program association table (PAT), a program map table (PMT), and an intra frame only when a first demultiplexing unit 300 fails to search for the PAT, the PMT, and the intra frame. If the first demultiplexing unit 300 succeeds in searching for the PAT, the PMT, and the intra frame, the second demultiplexing unit 200 does not search. If any information is not searched during the first demultiplexing, then during second demultiplexing, the non-searched information will be searched again. In an exemplary embodiment, the first and second demultiplexing units 300 and 200 share flag information. The flag information refers to three flags representing whether or not to succeed in searching for the PAT, the PMT, and the intra frame.

Reference symbol "SW" represents that the second and first demultiplexing units 200 and 300 are switched in operation. The second and first demultiplexing unit 200 and 300 are operated under the control of a controller (not shown). The controller controls the switching to perform the second demultiplexing after the first demultiplexing.

The first demultiplexing is to search for necessary information from a transport stream (TS) without reproducing video or audio data. The necessary information refers to the PAT, the PMT, and the intra frame. This information is necessary for confirming whether or not a received TS packet is an audio/video TS packet of a broadcasting (Note: Here "broadcasting channel switchover" or "channel switchover" denotes that a specific desired broadcasting is selected by a viewer) requested by the viewer.

The video or audio data is outputted from the first and second demultiplexing units 300 and 200, respectively, and is transmitted to and buffered in ring buffers (vid and aud) 100 and 150, respectively.

Figure 4:
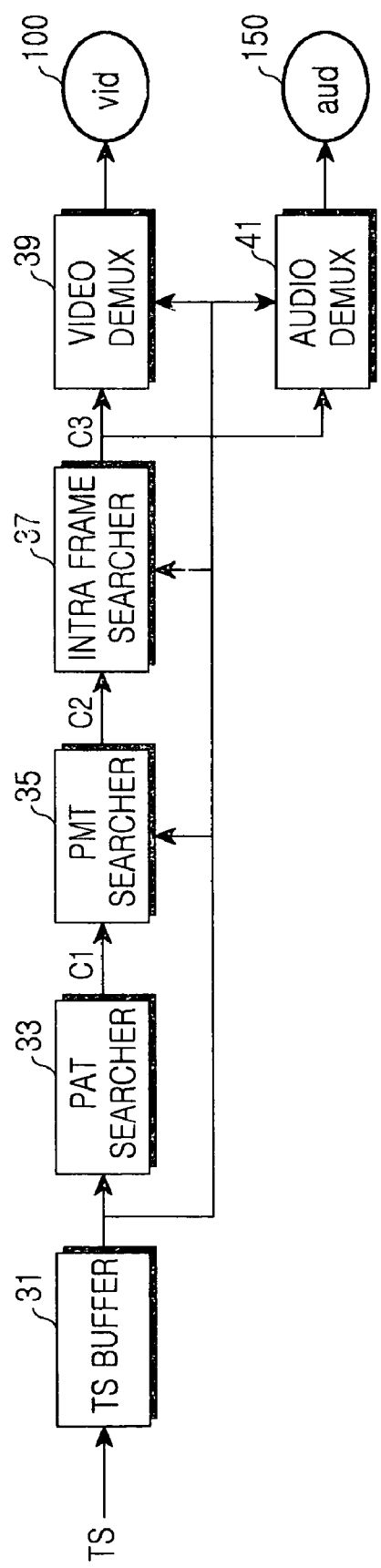
FIG. 4 is a block diagram illustrating a detailed construction of a first demultiplexing unit of FIG. 3.

FIG. 4 is a block diagram illustrating a detailed construction of the first demultiplexing unit of FIG. 3.

If the viewer inputs a desirable broadcasting channel to view, the digital broadcasting receiver detects the inputting of the broadcasting channel and receives the TS packets. If the digital broadcasting receiver receives the TS packets, a TS buffer 31 buffers the received TS packets. An amount of data buffered in the TS buffer 31 is set to be much greater than that of data buffered in a TS buffer 22 of FIG. 1.

A PAT searcher 33 searches the buffered TS packets of the TS buffer 31 for the PAT. If the PAT searcher 33 succeeds in searching for the PAT, it obtains a Packet IDentification (PID) list of the broadcasting channel and the PMT from the searched PAT, and obtains a PID of the PMT of the broadcasting channel that the viewer desires to view. Further, the PAT searcher 33 informs a PMT searcher 35 of its success in searching for the PAT. A control signal (C1) is a signal for the PAT searcher 33 to inform the PMT searcher 35 of its success in searching for the PAT.

In response to the control signal (C1) informing the success in searching for the PAT, on the basis of the PID of the PMT of the broadcasting channel that the viewer desires to view, the PMT searcher 35 analyzes a header of the TS packets buffered in the TS buffer 31 and confirms whether the TS packet is the PMT, thereby searching for the corresponding PMT.

If the PMT searcher 35 succeeds in searching for the PMT, it obtains a PID of an audio/video packetized elementary stream (PES) of the corresponding broadcasting channel from the searched PMT. Further, the PMT searcher 35 transmits a control signal (C2) for informing an intra frame searcher 37 of its success in searching for the PMT. In response to the control signal (C2), on the basis of the obtained PID of the audio/video PES, the intra frame searcher 37 analyzes the header of the TS packets buffered in the TS buffer 31 and confirms whether the TS packet is the intra frame, thereby searching for the intra frame.

If the intra frame searcher 37 also succeeds in searching for the intra frame, a video demultiplexer 39 and an audio demultiplexer 41 analyze the header of the TS packets buffered in the TS buffer 31, search for a video or audio TS packet of the corresponding broadcasting channel, demultiplex the searched video or audio TS packet, and output the video and audio data. The video and audio data are transmitted to and buffered in the corresponding ring buffers (vid and aud) 100 and 150, respectively.

If it succeeds in obtaining program information (search for PAT, PMT, and intra frame), a subsequent operation is performed in the second demultiplexing unit 200. If the first demultiplexing unit 300 performs the demultiplexing one time and succeeds in obtaining the program information, the second demultiplexing unit 200 can directly perform video or audio demultiplexing but, if it fails, the first demultiplexing unit 300 will repeat the demultiplexing a predetermined number of times. If the first demultiplexing unit 300 fails to obtain the program information even after the first demultiplexing has been performed the predetermined number of times, the second demultiplexing unit 200 can first obtain the program information and then, perform the video or audio demultiplexing as in the conventional art.

In comparison with FIG. 1, there is a difference in that, by separately performing the first demultiplexing, it is not required to discard the previous buffered TS data and again buffer the subsequent TS data when it fails to search for the PAT, the PMT, or the intra frame.

A capacity of the buffered TS data for the first demultiplexing is relatively greater than that of the second demultiplexing. For example, in the fist demultiplexing, the TS data received for about two seconds is stored. In the second demultiplexing, the TS data of about several to tens of packets are buffered. This is because it is a scheme for constantly storing predetermined data in the video/audio ring buffers (vid and aud) 100 and 150 of the rear stage, and by so doing, the video/audio can be stably reproduced. However, since the video/audio are not reproduced during the first demultiplexing, the entire system is not influenced in stability even though a large amount of TS data is buffered and simultaneously demultiplexed.

As a result, the inventive demultiplexing is effective in that a large amount of TS data can be reused. In other words, as in FIG. 1, when conventional demultiplexing is performed, the PAT/PMT are sequentially searched. However, as in FIGS. 3 and 4, when the first demultiplexing is performed with the demultiplexing divided into the first and second demultiplexings, the PAT is first searched, the PMT is again searched from the beginning without discarding the buffered TS data, and even the intra frame is similarly searched using the initially stored TS data from the beginning. If so, only a buffering time for the first demultiplexing is invested, and the time taken to searching for the PAT/PMT is avoided. Simply, the video/audio data are demultiplexed directly from the data buffered for the first demultiplexing.

Figure 5:
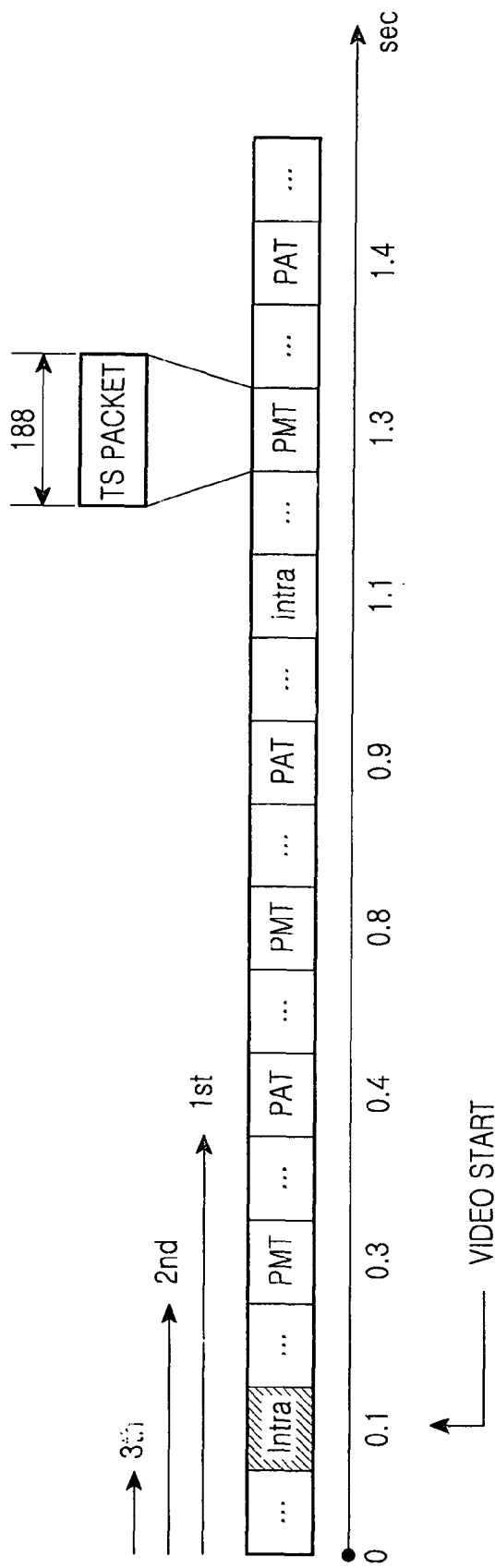
FIG. 5 illustrates an example for describing a video start time point based on demultiplexing according to the present invention.

FIG. 5 illustrates an example for describing a video start time point based on the demultiplexing according to the present invention.

For the initial 2 seconds, the TS data is buffered. The PAT can be searched at 0.4 seconds ($1^{st}$), but the PMT is searched at 0.3 seconds with reuse of the buffered data ($2^{nd}$), and the intra frame is searched at 0.1 second with reuse of the buffered data ($3^{rd}$), thereby performing the demultiplexing. As a result, the video data corresponding to 1.9 seconds is directly demultiplexed and therefore, can be displayed at once for the viewer. The viewer waits only for the initial 2 seconds before viewing the picture through the screen of the display unit. Accordingly, in comparison to a time of 3.1 seconds taken to perform the demultiplexing of FIG. 1, a channel switchover time can be reduced by one or more seconds in speed.

Switching to the second demultiplexing can be performed in a weak electric field where a desired PAT/PMT is not searched with the first demultiplexing.

The present invention has an advantage in that the demultiplexing of the TS packets is performed separately into the first demultiplexing and the second demultiplexing, thereby minimizing the time taken to search for the PAT, the PMT, and the intra frame, and improving a channel switchover speed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for controlling switchover of a broadcasting channel in a digital multimedia broadcasting receiver, the device comprising:

a first demultiplexing unit including a buffer for firstly buffering transport stream packets, and a Program Association Table (PAT) searcher, a Program Map Table (PMT) and an intra frame searcher for searching the firstly buffered transport stream packets sequentially for a Program Association Table (PAT), a Program Map Table (PMT), and an intra frame, respectively, the first demultiplexing unit further for obtaining program information on the broadcasting channel to be switched over; and a second demultiplexing unit for secondly buffering the transport stream packets, wherein the second demultiplexing unit searches from the obtained program information, the secondly buffered transport stream packets for an audio or video transport stream packet of the corresponding broadcasting channel, and performs audio or video demultiplexing for the searched audio or video transport stream packet without searching for the respective PAT, PMT, and intra frame, when the first demultiplexing unit succeeds in searching for the PAT, the PMT, and the intra frame on the broadcasting channel to be switched over, and wherein when the first demultiplexing unit fails to search the PAT, the PMT, and the intra frame, the first demultiplexing unit searches for the PAT, the PMT and the intra frame by reusing the firstly buffered transport stream packets without discarding the firstly buffered transport stream packets, wherein the device further comprises an audio demultiplexer for searching the firstly buffered transport stream packets for the audio transport stream packet of the corresponding broadcasting channel, and performing the audio demultiplexing for the searched audio transport stream packet, and a video demultiplexer for searching the firstly buffered transport stream packets for the video transport stream packet of the corresponding broadcasting channel, and performing the video demultiplexing for the searched video transport stream packet, and wherein the PAT searcher, the PMT searcher, and the intra frame searcher search the PAT, the PMT, and the intra frame, respectively, by reusing the firstly buffered transport stream packets.

2. The device of claim 1, wherein if the first demultiplexing unit performs demultiplexing one time and succeeds in obtaining the program information, the second demultiplexing unit subsequently performs the demultiplexing.

3. The device of claim 1, wherein when the first demultiplexing unit searches for the respective PAT, PMT, and intra frame, it repeats the search from a first one of the firstly buffered packets.

4. The device of claim 1, wherein when the PAT searcher succeeds in searching for the PAT, the PMT searcher searches for the PMT and, when the PMT searcher succeeds in searching for the PMT, the intra frame searcher searches for the intra frame and, when the intra frame searcher succeeds in searching for intra frame, the video demultiplexer performs the video demultiplexing.

5. The device of claim 1, wherein firstly buffered data is greater in amount than secondly buffered data.

6. The device of claim 1, wherein when the first demultiplexing unit fails to search for the PAT, the PMT, and the intra frame, the second demultiplexing unit sequentially searches for the PAT, the PMT, and the intra frame without again starting to search from a first one of the secondly buffered transport stream packets.

7. The device of claim 1, wherein the second demultiplexing unit comprises:

a buffer for secondly buffering the transport stream packets;

a PAT searcher for searching the secondly buffered transport stream packets for the PAT;

a PMT searcher for, upon success in searching for the PAT, searching the secondly buffered transport stream packets for the PMT;

an intra frame searcher for, upon success in searching for the PMT, searching the secondly buffered transport stream packets for the intra frame;

an audio demultiplexer for, upon sequential success in searching for the PAT and the PMT, searching the secondly buffered transport stream packets for the audio transport stream packet of the corresponding broadcasting channel, and performing the audio demultiplexing for the searched audio transport stream packet; and a video demultiplexer for, upon sequential success in searching for the PAT, the PMT, and the intra frame, searching the secondly buffered transport stream packets for the video transport stream packet of the corresponding broadcasting channel, and performing the video demultiplexing for the searched video transport stream packet, whereby upon failure to search for any one of the PAT, the PMT, and the intra frame, subsequent transport stream packets are secondly buffered and start from the PAT search.

8. A method for controlling switchover of a broadcasting channel in a digital multimedia broadcasting receiver, the method comprising:

firstly buffering transport stream packets by a first demultiplexing unit;

searching the firstly buffered transport stream packets sequentially for a Program Association Table (PAT), a Program Map Table (PMT), and an intra frame by a PAT searcher, a PMT searcher and an intra frame searcher, respectively, and obtaining program information of the corresponding broadcasting channel by using the firstly buffered transport stream packets without discarding the firstly buffered transport stream packets when the first demultiplexing unit fails to search the PAT, the PMT, and the intra frame;

from the obtained program information, searching the firstly buffered transport stream packets for an audio or video transport stream packet of the corresponding broadcasting channel, and demultiplexing the searched audio or video transport stream packet without searching for the respective PAT, PMT and intra frame, when succeeding in searching the firstly buffered transport stream packets for the PAT, the PMT and the intra frame on the broadcasting channel to be switched over;

upon obtaining of the program information, secondly buffering the transport stream packets by a second demultiplexing unit;

from the obtained program information, searching the secondly buffered transport stream packets for an audio or video transport stream packet of the corresponding broadcasting channel, and audio or video demultiplexing the searched audio or video transport stream packet;

searching, by an audio demultiplexer, the firstly buffered transport stream packets for the audio transport stream packet of the corresponding broadcasting channel, and performing the audio demultiplexing for the searched audio transport stream packet, and searching, by a video demultiplexer, the firstly buffered transport stream packets for the video transport stream packet of the corresponding broadcasting channel, and performing the video demultiplexing for the searched video transport stream packet, wherein the PAT searcher, the PMT searcher, and the intra frame searcher search the PAT, the PMT, and the intra frame, respectively, by reusing the firstly buffered transport stream packets.

9. The method of claim 8, wherein the searching step comprises:

checking and searching the firstly buffered transport stream packets for the PAT from a first packet;

checking and searching the firstly buffered transport stream packets for the PMT from the first packet; and checking and searching the firstly buffered transport stream packets for the intra frame from the first packet.

10. The method of claim 8, further comprising, upon failure to obtain the program information in the searching step, sequentially searching the secondly buffered transport stream packets for the PAT, the PMT, and the intra frame.

11. The method of claim 10, further comprising, upon failure to search sequentially for the PAT, the PMT, and the intra frame or to search for even any one of the PAT, the PMT, and the intra frame in the searching step, discarding currently buffered transport stream packets and returning to the step of secondly buffering to buffer subsequent transport stream packets.

* * * * *